United States Patent
Allen et al.

(10) Patent No.: US 11,451,376 B2
(45) Date of Patent: Sep. 20, 2022

(54) SYSTEMS AND METHODS FOR SECURE COMMUNICATION

(71) Applicant: Mastercard International Incorporated, Purchase, NY (US)

(72) Inventors: John Allen, Newcastle (IE); Ashley Waldron, Dublin (IE); Dawid Nowak, Dublin (IE)

(73) Assignee: Mastercard International Incorporated, Purchase, NY (US)

(*) Notice: Subject to any disclaimer, the term of this patent is extended or adjusted under 35 U.S.C. 154(b) by 123 days.

(21) Appl. No.: 16/850,151

(22) Filed: Apr. 16, 2020

(65) Prior Publication Data

US 2020/0344047 A1 Oct. 29, 2020

(30) Foreign Application Priority Data

Apr. 25, 2019 (EP) .................................... 19171179

(51) Int. Cl.
*H04L 9/08* (2006.01)

(52) U.S. Cl.
CPC .......... *H04L 9/0819* (2013.01); *H04L 9/0841* (2013.01); *H04L 9/0866* (2013.01)

(58) Field of Classification Search
CPC ... H04L 9/0819; H04L 9/0841; H04L 9/0866; H04L 9/0827; H04L 63/18; H04L 63/06; H04L 9/3215; H04L 9/14; H04L 9/08; G06F 21/42
See application file for complete search history.

(56) References Cited

U.S. PATENT DOCUMENTS

| | | | |
|---|---|---|---|
| 9,225,538 B2* | 12/2015 | Joy | H04L 67/26 |
| 9,444,620 B1 | 9/2016 | Murphy et al. | |
| 9,923,923 B1* | 3/2018 | Sharifi Mehr | H04L 9/14 |
| 9,980,140 B1* | 5/2018 | Spencer | G06K 7/10722 |
| 10,021,113 B2* | 7/2018 | Oberheide | H04L 9/3247 |

(Continued)

OTHER PUBLICATIONS

European Search Report from European Application No. 19171179.5 entitled Systems and Methods for Secure Communication (dated Oct. 16, 2019).

(Continued)

*Primary Examiner* — Techane Gergiso
(74) *Attorney, Agent, or Firm* — Hovey Williams LLP

(57) ABSTRACT

There is presented a method, a computing device and a computing system for establishing secure communication between computing devices. A method for a first computing device to establish trusted communication with a second computing device comprises the first computing device sending a request to create a secure channel to the second computing device, the request comprising a first cryptographic element and a device identifier. The first computing device receives a channel identifier from the second computing device in response to the request, and a notification over a secure channel using the device identifier, the notification comprising a channel identifier and a second cryptographic element. The first computing device compares the channel identifier received in the response to the request and the channel identifier received in the notification and, if the first computing device determines that the two channel identifiers match, the first computing device deriving a secret key using the first cryptographic element and the second cryptographic element.

20 Claims, 5 Drawing Sheets

(56) References Cited

U.S. PATENT DOCUMENTS

| | | | |
|---|---|---|---|
| 10,389,831 B2 * | 8/2019 | Somani | H04L 67/025 |
| 10,462,113 B1 * | 10/2019 | Venkataramani | H04L 9/3215 |
| 2005/0076216 A1 | 4/2005 | Nyberg | |
| 2006/0039305 A1 | 2/2006 | Thawani et al. | |
| 2006/0203770 A1 * | 9/2006 | Kjellberg | H04W 76/40 |
| | | | 370/329 |
| 2007/0038716 A1 | 2/2007 | Saguy | |
| 2008/0103984 A1 | 5/2008 | Choe et al. | |
| 2008/0141313 A1 * | 6/2008 | Kato | H04N 21/2347 |
| | | | 725/62 |
| 2009/0094646 A1 * | 4/2009 | Walter | H04N 21/4622 |
| | | | 725/48 |
| 2012/0311329 A1 * | 12/2012 | Medina | G06F 21/606 |
| | | | 713/168 |
| 2014/0075515 A1 * | 3/2014 | McColgan | H04W 12/069 |
| | | | 726/4 |
| 2014/0245396 A1 * | 8/2014 | Oberheide | G06F 21/40 |
| | | | 726/4 |
| 2015/0304847 A1 * | 10/2015 | Gong | H04B 7/14 |
| | | | 455/411 |
| 2016/0078430 A1 * | 3/2016 | Douglas | G06Q 30/0185 |
| | | | 705/43 |
| 2016/0315923 A1 * | 10/2016 | Riscombe-Burton | |
| | | | H04L 63/18 |
| 2017/0279795 A1 * | 9/2017 | Redberg | H04L 63/0861 |
| 2017/0318012 A1 | 11/2017 | Kim et al. | |
| 2017/0325091 A1 | 11/2017 | Freeman et al. | |
| 2018/0027029 A1 * | 1/2018 | Linder | G06Q 30/016 |
| | | | 709/204 |
| 2018/0197144 A1 * | 7/2018 | Frank | G06Q 10/103 |
| 2019/0036914 A1 * | 1/2019 | Tzur-David | H04L 63/10 |
| 2019/0305955 A1 * | 10/2019 | Verma | H04L 63/18 |
| 2019/0363886 A1 * | 11/2019 | Atwood | H04W 12/06 |
| 2020/0067922 A1 * | 2/2020 | Avetisov | H04L 63/18 |

OTHER PUBLICATIONS

PCT International Search Report and Written Opinion from PCT Application No. PCT/US2020/023079 entitled Systems and Methods for Secure Communication (dated Jun. 11, 2020).

\* cited by examiner

SYSTEMS AND METHODS FOR SECURE COMMUNICATION

CROSS REFERENCE TO RELATED APPLICATIONS

This application claims priority to European Application No. 19171179.5, filed Apr. 25, 2019, which is incorporated herein by reference in its entirety

TECHNICAL FIELD

The present disclosure relates to secure communication between computing devices. In embodiments, it relates to a method of establishing a trusted communication between a client computing device and a server, and to a user computing device and a server adapted to support such a method.

BACKGROUND

Password based encryption is commonly used to protect data exchanged between two computing devices. This can be achieved by using a symmetric cryptographic key derived from a string (password) associated with a user. A password additionally serves to authenticate a user as the intended user of the service provided through encrypted communication between the two computing devices. Currently, password-based authentication is not considered to provide a high enough level of security in itself for many systems that contain sensitive information. Indeed, passwords can be intercepted, stolen or even guessed, sometimes without the user being aware of this. In addition, users are prone to forgetting passwords or mistakenly entering the incorrect password resulting in the system becoming locked. Biometric authentication, where biometric data associated with a user can be used to authenticate the user, provide an alternative to password-based authentication, which alleviates some of the above problems.

Therefore, there is still a need for secure communication methods that can replace or be combined with existing systems to increase their reliability and ease of use.

SUMMARY OF THE DISCLOSURE

According to a first aspect, there is provided a method for establishing trusted communication between a first computing device and a second computing device. The method comprises the first computing device sending a request to create a secure channel to the second computing device, the request comprising a first cryptographic element and a device identifier. Having received the request from the first computing device, the second computing device sends a response to the request, the response comprising a channel identifier, as well as a notification addressed using the device identifier. The notification comprises the channel identifier as well as a second cryptographic element. The method further comprises the second computing device generating a secret key using the first cryptographic element and the second cryptographic element. Upon receipt of the response and the notification from the second computing device, the first computing device compares the channel identifier received in the response to the request and the channel identifier received in the notification. If the first computing device determines that the two channel identifiers match, the first computing device derives a secret key using the first cryptographic element and the second cryptographic element.

According to a second aspect of the disclosure, there is provided a method for a first computing device to establish trusted communication with a second computing device. The method comprises the first computing device sending a request to create a secure channel to the second computing device, the request comprising a first cryptographic element and a device identifier. The method further comprises the first computing device receiving a channel identifier from the second computing device in response to the request; and the first computing device receiving a notification from the second computing device, wherein the notification comprises a channel identifier and a second cryptographic element and is addressed to the first computing device using the device identifier. The first computing device then compares the channel identifier received in the response to the request and the channel identifier received in the notification and, if the first computing device determines that the two channel identifiers match, the first computing device derives a secret key using the first cryptographic element and the second cryptographic element.

In embodiments, the first computing device determines that the two channel identifiers match if the two channel identifiers are identical. In other embodiments, the first computing device determines that the two channel identifiers match if one channel identifier is derived from the other channel identifier.

In embodiments, the first cryptographic element and the second cryptographic element are public keys, and the secret key is a private key. In embodiments, the secret key is a symmetric key.

In embodiments, the notification is received by the first computing device through a notification service device. Any secure notification service that is tied to the first computing device via the device identifier may be used within the context of the disclosure. In embodiments, the notification is received through Apple Push Notification Service (APNs) or Firebase Cloud Messaging (FCM), Amazon Simple Notification Service (SNS), Azure Notification Hubs, BlackBerry Push Notifications service, etc.

In embodiments, the device identifier is a device token.

In embodiments, the first computing device sends the request through an application installed on the first computing device. For example, the application may be a banking application. In embodiments, the application is configured to send the request and to compare the channel identifiers. In embodiments, the application is further configured to register the device with a notification service device, and generate a device token associated with the device and the application.

In embodiments, the method further comprises the first computing device sending one or more messages to the second computing device, wherein each message comprises or otherwise specifies the channel identifier, and sending each message comprise the first computing device encrypting the message using the secret key.

In embodiments, the method further comprises the first computing device receiving one or more messages from the second computing device, wherein each message comprises or otherwise specifies the channel identifier, and receiving each message comprises decrypting the message using the secret key.

In embodiments, the one or more messages do not comprise the device identifier. In embodiments, the one or more messages do not comprise any personally identifiable information.

In embodiments, if the first computing device determines that the two channel identifiers do not match, the method further comprises the first computing device discarding the information received in the response to the request and/or in the notification.

In embodiments, the method further comprises the first computing device generating the first cryptographic element as a random string. The random string may be generated based on at least one parameter of the first computing device.

In embodiments, the random string is a randomly generated 32 bytes data string. In embodiments, the random string is generated using a parameter of the device selected from: device model, device serial number, screen size, operating system, etc.

According to a third aspect of the present disclosure, there is provided a method for a first computing device to establish trusted communication with a second computing device. The method comprises the second computing device receiving a request to create a secure channel from the first computing device, the request comprising a first cryptographic element and a device identifier. The method further comprises the second computing device sending to the first computing device: (a) a channel identifier in response to the request; (b) a notification addressed using the device identifier, the notification comprising the channel identifier and a second cryptographic element. The method further comprises the second computing device deriving a secret key using the first cryptographic element and the second cryptographic element.

In embodiments, the method further comprises the second computing device recording an association between the device identifier and the channel identifier.

In embodiments, the method further comprises the second computing device receiving a request to associate a device identifier with a user identifier, and recording an association between the user identifier and the device identifier.

In embodiments, the second computing device forms part of a transaction infrastructure. In such embodiments, the user identifier may comprise an account number.

As a result of the second computing device recording an association between the device identifier and the channel identifier (and optionally also the user identifier), no personally identifiable information other than the device identifier is exchanged at any point, and no personally identifiable information is exchanged at all after the request has been sent.

In embodiments, the method further comprises the second computing device sending one or more messages to the first computing device, wherein each message comprises or otherwise specifies the channel identifier, and sending each message comprise the second computing device encrypting the message using the secret key.

In embodiments, the method further comprises the second computing device receiving one or more messages from the first computing device, wherein each message comprises or otherwise specifies the channel identifier, and receiving each message comprises decrypting the message using the secret key.

In embodiments, the one or more messages are received through a public network, such as the public internet.

In embodiments, the method further comprises the second computing device generating the second cryptographic element as a random string. In embodiments, the second cryptographic element is a randomly generated 32 bytes data string.

In embodiments, the method further comprises the second computing device recording a channel identifier as expired if the second computing device does not receive any messages associated with the channel identifier for a predetermined period of time. In embodiments, the method further comprises the second computing device recording a channel identifier as expired if the second computing device does not receive any messages associated with the channel identifier within a predetermined period of time from the receipt of the request to create the secure channel. In embodiments, the method further comprises the second computing device recording a channel identifier as expired if a predetermined period of time has elapsed since the receipt of the request to create the secure channel.

Advantageously, the second computing device being able to close channels if they are not used may reduce the risks of the system being subject to distributed denial of service attacks.

The second computing device may be configured to close channels after a set period of time regardless of whether the channel was used. This may reduce the risk of attacks as channels are only used for a certain period of time and must be regularly re-initiated. For example, the set period of time may be chosen to be long enough to allow typical interactions between the first and second computing devices to occur over a channel, but short enough that each new interaction will trigger the initiation of a new channel. For example, the set period of time may be chosen as 10, 15 or 20 minutes.

In embodiments, the second computing device may be configured to record a channel identifier as expired if it does not receive any message using that channel identifier after a predetermined period of time. The predetermined period of time may be chosen to be shorter than the set period of time used to close a channel that has been used to exchange messages. For example, the predetermined period of time may be chosen as 1 minute, 2 minutes or 5 minutes.

In embodiments of any of the aspects of the disclosure, the request further comprises at least one parameter of the first computing device. In embodiments, the parameter of the first computing device is selected from: device model, device serial number, screen size, operating system, etc. In embodiments, the method further comprise the second computing device identifying a notification service through which the notification is to be sent based on the at least one parameter of the first computing device.

In embodiments of the third aspect, the method further comprises the second computing device receiving a request to associate a device identifier with at one or more parameters of a first computing device, recording the association between the device identifier and the one or more parameters, and upon receipt of a request from a first computing device, verifying that the device identifier in the request is associated with the at least one parameter of the first computing device.

In embodiments of any of the aspects of the disclosure, the request to create a secure channel and/or the response to the request is/are communicated through a public channel.

In embodiments of any of the aspects of the disclosure, the request to create a secure channel and/or the response to the request is/are communicated through the public internet.

In embodiments of any of the aspects of the disclosure, the channel identifier is a unique string. In embodiments of the third aspect, the method further comprises the second computing device computing a channel identifier as a unique string.

In embodiments of the third aspect of the disclosure, each of the one or more messages communicated using the channel identifier comprises a counter, and the method comprises the second computing device recording a counter associated with the channel identifier and incrementing the counter when a message is sent or received using the channel identifier. In some such embodiments, the method further comprises after receipt of a message comprising a channel identifier, the second computing device: comparing the recorded counter associated with the channel identifier and the counter in the message, and recording the channel identifier as expired if the second computing device determines that the counter in the message does not correspond to a single increment of the recorded counter associated with the channel identifier.

in embodiments, the second computing device recording the channel identifier as expired comprises the second computing device discarding any association between the channel identifier and a device identifier or other parameters associated with the device or user. In embodiments, the second computing device recording the channel identifier as expired comprises the second computing device discarding any message received that includes the channel identifier, preferably before decrypting the massage, and/or the second computing device discarding the secret key associated with the channel identifier.

In embodiments of any of the aspects of the disclosure, the secret key is derived using a Diffie-Hellman or Elliptic-curve Diffie Hellman protocol. In embodiments, the secret key is derived by the first/second computing device by computing a shared secret using a private key and the second/first cryptographic element, and the first/second computing device deriving a symmetric key from the shared secret.

In embodiments of any of the aspects of the disclosure, wherein the method is used as part of a method of establishing trusted communication with a first computing device wherein authentication of the user is performed by biometric authentication. In embodiments, the method further comprises the first computing device performing a biometric authentication of a user prior to sending the request to the second computing device, if the biometric authentication is successful.

According to a further aspect, the disclosure provides a computing device comprising a processor and a memory. The computing device is configured to establish trusted communication with a second computing device by: sending a request to create a secure channel to the second computing device, the request comprising a first cryptographic element and a device identifier; receiving a channel identifier from the second computing device in response to the request; receiving a notification from the second computing device, the notification comprising a channel identifier and a second cryptographic element, wherein the notification is sent over a secure channel using the device identifier; comparing the channel identifier received in the response to the request and the channel identifier received in the notification, and deriving a secret key using the first cryptographic element and the second cryptographic element, if the comparison indicates that the two channel identifiers match.

In embodiments, the computing device is a mobile device such as a mobile phone. In embodiments, the second computing device is a server computer.

The computing device according to this aspect may have any of the features described in relation to the first and second aspects. In particular, the computing device may be configured to perform any of the steps performed by the first computing device of the second aspect above.

According to a further aspect, the disclosure provides a computing device comprising a processor operationally connected to one or more databases. The computing device is configured to establish trusted communication with a further computing device by: receiving a request to create a secure channel from the further computing device, the request comprising a first cryptographic element and a device identifier; sending a channel identifier to the further computing device in response to the request; sending a notification to the further computing device over a secure channel using the device identifier, the notification comprising the channel identifier and a second cryptographic element; and deriving a secret key using the first cryptographic element and the second cryptographic element.

In embodiments, the computing device is a server computer. In embodiments, the further computing device is a mobile device such as a mobile phone.

The computing device according to this aspect may have any of the features described in relation to the first or third aspects. In embodiments, the computing device may be configured to perform any of the steps performed by the second computing device of the third aspect above.

Advantageously, the methods described herein enable secure exchange of messages between a first and a second computing device across a network in a manner similar to password-based encryption, but without requiring the user to generate or enter a password at any point in the process. This may be particularly useful in solutions that advantageously do not rely on passwords (or PINs) for authentication of a user, such as for example in solutions relying on biometric authentication, where a password may otherwise still be necessary for encryption of the data exchanged between the devices.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the disclosure will now be described, by way of example only, with reference to the accompanying drawings, in which.

Figure 1:
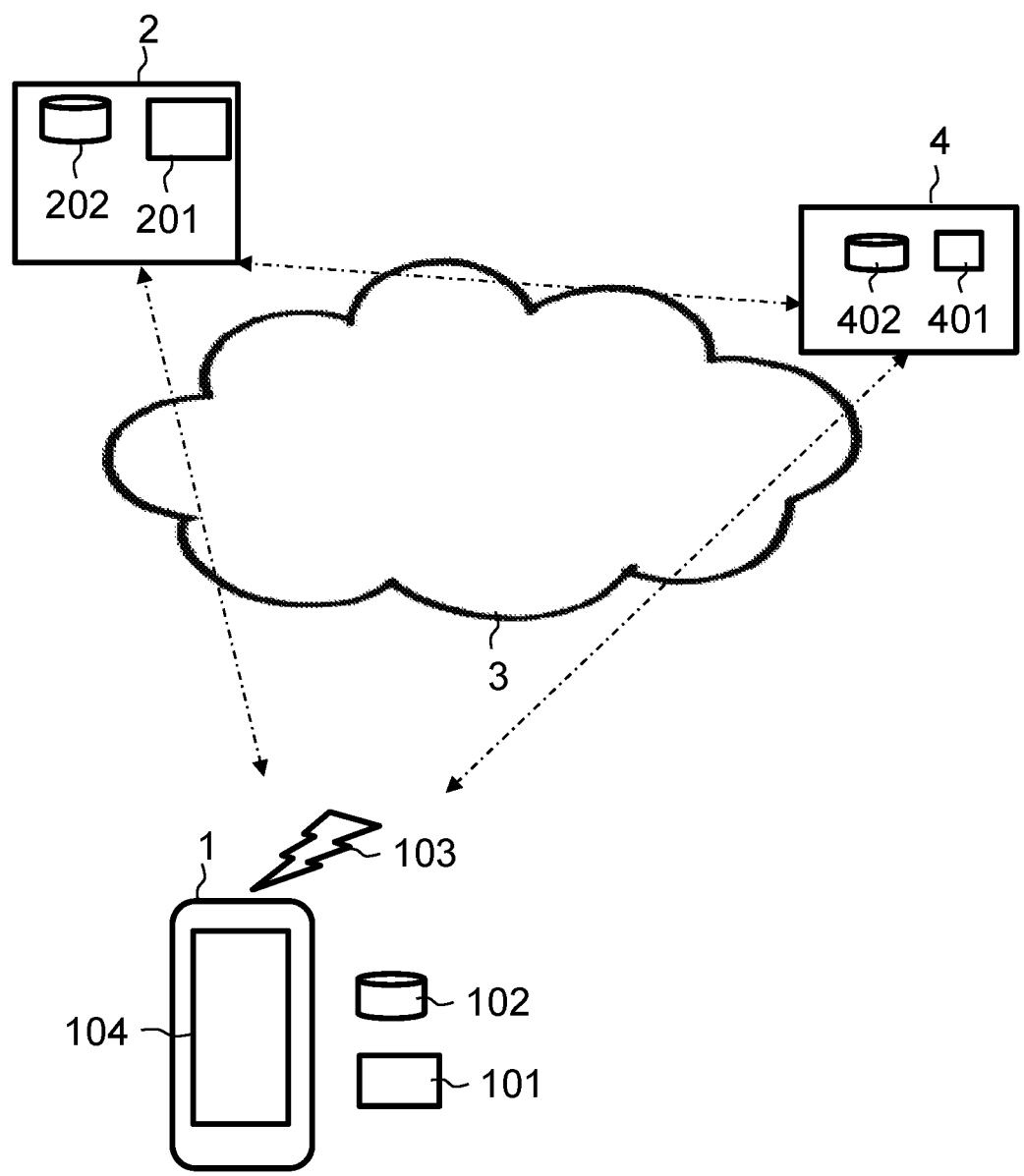
FIG. 1 shows an exemplary computing system in which embodiments of the present disclosure may be used.

Where the figures laid out herein illustrate embodiments of the present disclosure, these should not be construed as limiting to the scope of the disclosure. Where appropriate, like reference numerals will be used in different figures to relate to the same structural features of the illustrated embodiments.

DETAILED DESCRIPTION

Specific embodiments of the disclosure will be described below with reference to the Figures.

FIG. 1 shows an exemplary computing system in which embodiments of the present disclosure may be used.

A user (not shown) is provided with a first computing device—typically a mobile computing device such as a mobile phone 1. The computing device 1 has at least one processor 101 and at least one memory 102 together providing at least one execution environment. Typically, a mobile device has firmware and applications run in at least one regular execution environment (REE) with an operating system such as iOS, Android or Windows. The computing device 1 may also be equipped with means 103 to communicate with other elements of computing infrastructure, for example via the public internet 3. These may comprise a wireless telecommunications apparatus for communication with a wireless telecommunications network and local wireless communication apparatus to communicate with the public internet 3 using e.g. W-Fi technology.

The computing device 1 comprises a user interface 104 which typically includes a display. The display 104 may be a touch screen. Other types of user interfaces may be provided, such as e.g. a speaker, keyboard, one or more buttons (not shown), etc. Further, the computing device 1 may be equipped with data capture means, such as a camera, or a microphone.

A second computing device 2 is also shown in FIG. 1. The second computing device 2 may for example form part of a service provider computing system. For example, as will be explained further below, the second computing device 2 may form part of a transaction system. For example, the second computing device 2 may form part of the computing system of a wallet provider, card issuer or banking infrastructure. The second computing device 2 typically comprises one or more processors 201 (e.g. servers), a plurality of switches (not shown), and one or more databases 202, and is not described further here as the details of the second computing device 2 used are not necessary for understanding how embodiments of the disclosure function and may be implemented. The first computing device 1 can be connected to the service provider computing device 2 by a network connection, such as via the public internet 3. In particular, the service provider computing system 2 may be able to communicate with the first computing device 1 through a notification service device 4, for example a push notification service device 4. The notification service device 4 comprises one or more processors 401 (e.g. servers), a plurality of switches (not shown), and one or more databases 402, and is not described further here as the details of the notification service device 2 used are not necessary for understanding how embodiments of the disclosure function and may be implemented. The notification service device 4 is able to communicate (e.g. push) a message securely to a computing device, using a device identifier. In the illustrated embodiment, the service provider computing system 2 and the notification service device 4 are two separate computing devices that may be provided by the same or different parties. However, in other embodiments, the functionalities of the service provider computing system 2 and the notification service device 4 may be provided by the same device or multiple devices forming part of the same computing system.

Figure 2:
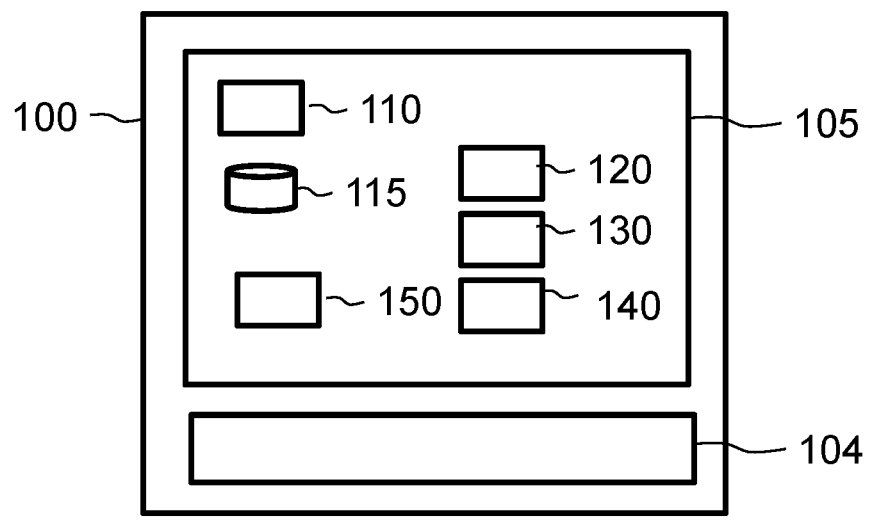
FIG. 2 illustrates schematically the software architecture of a computing device, in accordance with an embodiment of the disclosure.

FIG. 2 illustrates the software architecture of a mobile computing device 100 which can be used as computing device 1, in accordance with an embodiment of the disclosure. In FIG. 2, a main operating environment 105 of the mobile computing device 1 is shown along with a protected operating environment 104. The protected operating environment may be a SIM (not shown). Alternatively, there may be a sandbox or other logically protected environment in the main operating environment to provide a secure environment.

The main operating environment 105 comprises an application processor 110 and associated memories 115. The main operating environment may also comprise other applications typically used by such a mobile computing device, such as a browser 120, a modem 140, and a notification application 130. The notification application 130 may be able to receive messages (also referred to as "push notifications") from a notification service device 4 over a secure channel and communicate with applications such as application 150 (See below) that have registered with a notification service associated with the notification application.

The main operating environment 105 may further comprise an application 150 that is used to communicate with the second computing device. For example, the application may be a banking application, such as a mobile payment application 150, also referred to as digital wallet. In FIG. 2, this application is explicitly shown in the protected operating environment. The application may be located within the SIM or within another physically or logically protected environment. Further, data from this application may be located in a protected memory.

Figure 3A:
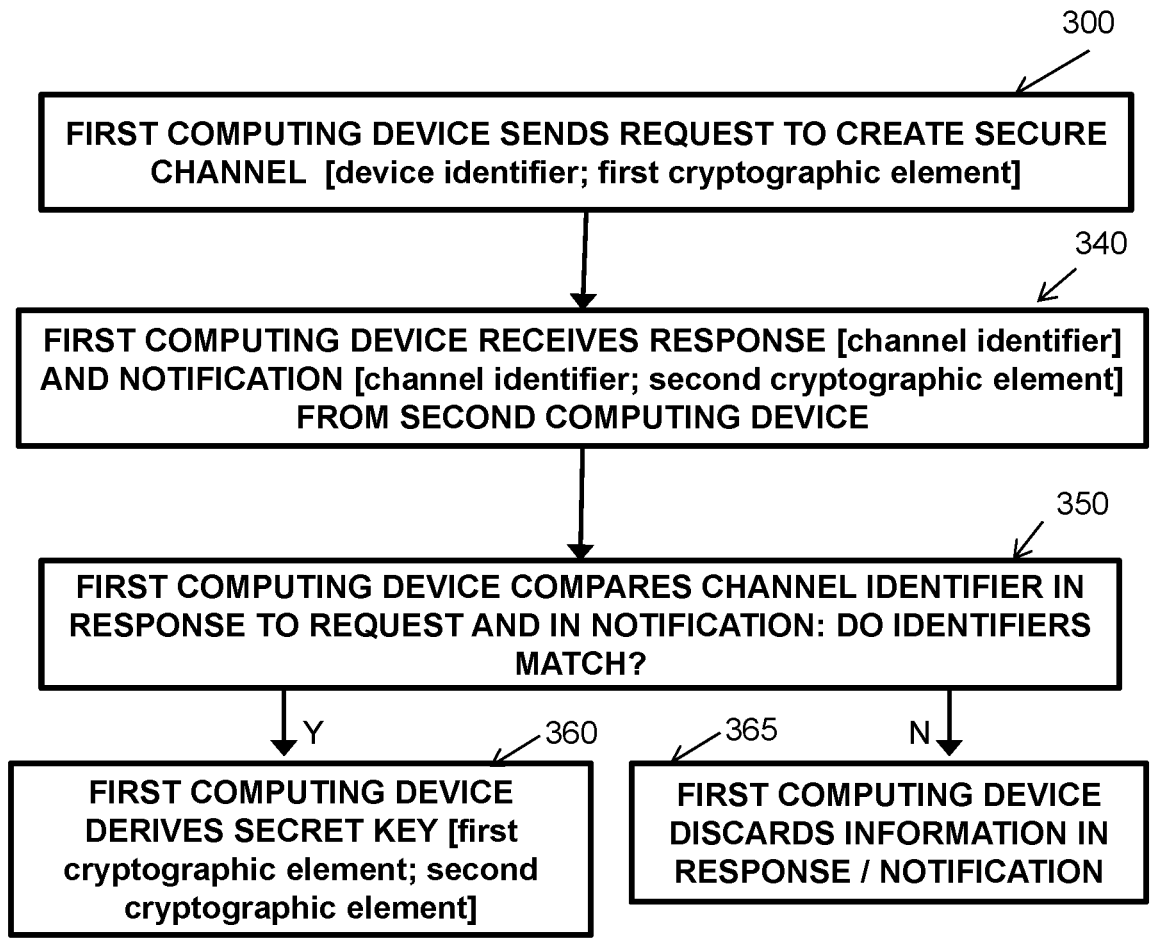
FIGS. 3A and 3B are flow charts illustrating a method of establishing trusted communication between a first computing device and a second computing device, as seen from the first computing device (FIG. 3A) and from the second computing device (FIG. 3B)
Figure 3B:
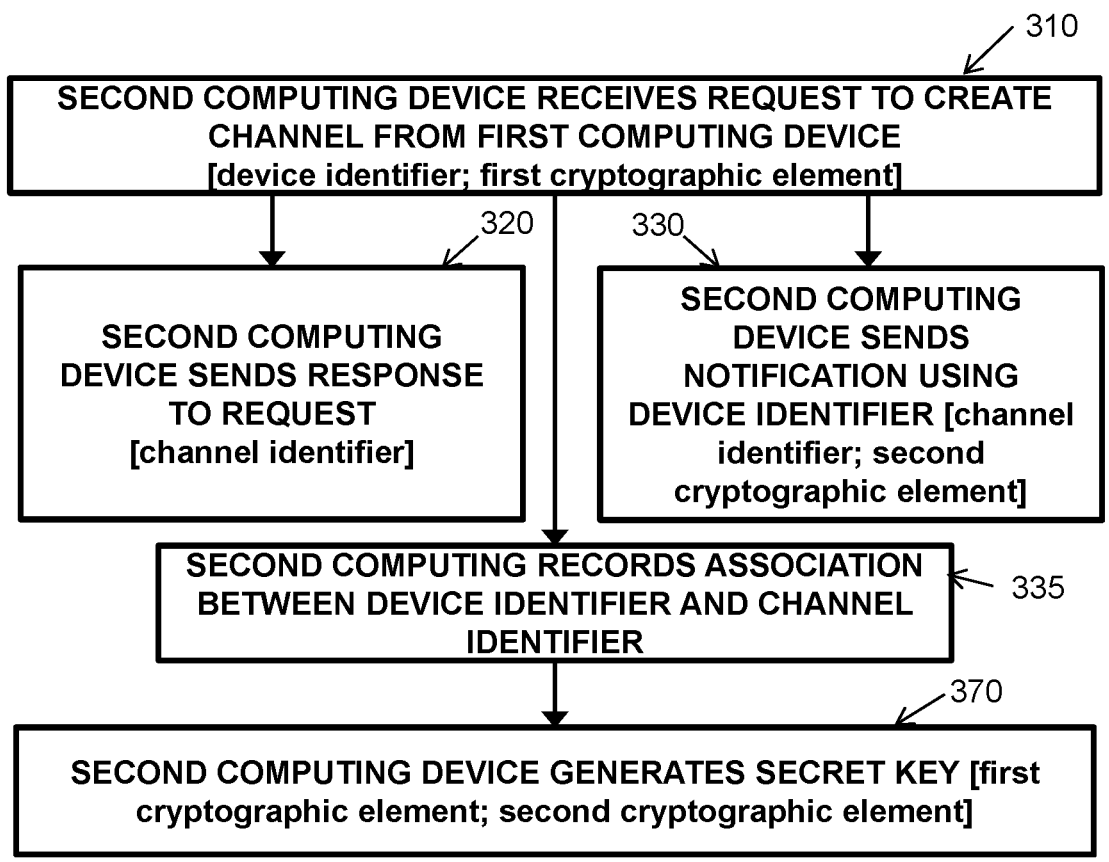

FIGS. 3A and 3B show a general embodiment of a method of establishing trusted communication between a first computing device and a second computing device, as seen from the first computing device (FIG. 3A) and from the second computing device (FIG. 3A).

At step 300, a first computing device 1, for example a mobile computing device as described in relation to FIG. 2, sends a request to create a secure channel to a second computing device 2, for example a service provider computer such as a remote server connected with one or more databases. The request may be sent on a public channel, for example via the public internet. The request comprises a first cryptographic element and a device identifier, as indicated in square brackets on FIG. 3. In embodiments, the request is sent via an application, such as application 150, for example a banking application. In embodiments, the device identifier is a device token. A device token may advantageously be generated as part of a notification service (also referred to as "push notification service") to route notifications to a particular device (in which case the device token may also be referred to as "push token"), through a notification application 130 securely receiving communications from a notification application device 4. In embodiments, the device identifier and first cryptographic element may be sent to the second computing device in one or more associated messages.

At step 310, the second computing 2 device receives the request from the first computing device 1. The second computing device 2 then sends 320 a response to the request, the response comprising a channel identifier, as indicated in square brackets. The response to the request may be sent on a public channel, for example via the public internet 3.

In embodiments, the second computing device 2 sending a response comprising a channel identifier may comprise the second computing device 2 computing a channel identifier. In embodiments, the second computing device 2 may compute a channel identifier using a process that guarantees that the channel identifier is unique, where a channel identifier may be unique if it is not identical to any channel identifier previously generated by the second computing device 2, to any channel identifier currently in use by the second computing device 2, or to any channel currently recorded in a database 202 associated with the second computing device 2.

The second computing device 2 additionally sends 330 a notification to the first computing device 1, preferably through a secure channel, using the device identifier to address the notification to the first computing device 1. As the skilled person will understand, the notification may be sent prior to, subsequent to or simultaneously with sending the response to the request. The notification comprises a channel identifier as well as a second cryptographic element. In embodiments, the channel identifier sent in the response is the same as the channel identifier sent in the notification. In embodiments, the channel identifier sent in the response is related to (such as e.g. derived from, or used to derive) the channel identifier sent in the notification.

In embodiments, the second computing device 2 sending the notification comprises the second computing device 2 sending the notification to a notification service device 4, and the notification service device 4 sending the notification to the first computing device 1. In embodiments, the notification service device 4 forms part of a push notification service. For example, the second computing device may send the notification through Apple Push Notification Service (APNs) or Firebase Cloud Messaging (FCM), Amazon Simple Notification Service (SNS), Azure Notification Hubs, BlackBerry Push Notifications service, etc. In such embodiments, the notification service device 4 may send the notification to a notification application 130 on the first computing device 1. As the skilled person would understand, the first computing device 1 receiving messages through the notification service device 4 may involve the pre-registration of the first computing device 1 with the notification service. For example, the application 150 that is used to communicate with the second computing device 2 may interact with a notification service device 4 to register a device token associated with the device 1 and the application 150, before being able to receive notifications using the device token.

Advantageously, the use of a secure notification service, such as a push notification service, ensures that the notification (comprising the second cryptographic element) is securely sent to the specific device that made the request to create a secure channel, and thereby reduces the risk of eavesdropping.

In embodiments, the request further comprises at least one parameter of the first computing device. For example, a parameter of the computing device may be selected from the group comprising: device model, device serial number, screen size, operating system, etc. In such embodiments, the second computing device may identify a notification service through which the notification is to be sent based on the at least one parameter of the first computing device.

In embodiments, the method further comprises the second computing device 2 generating the second cryptographic element as a random string. For example, the second cryptographic element may be generated as 32 random bytes.

At step 335, the second computing device 2 records an association between the device identifier and the channel identifier, in a database 202. The recording of the association may mark the secure channel associated with the channel identifier as valid (i.e. 'in use'). Alternatively, the further recording of the secret key associated with the channel identifier in the database 202 (see below) may mark the channel associated with the channel identifier as valid (i.e. 'in use').

At step 340, the first computing device 1 receives the response to the request and the notification. At step 350, the first computing device 1 compares the channel identifier received in the response to the request and the channel identifier received in the notification. At step 360, if the first computing device 1 determines that the two channel identifiers match, the first computing device 1 derives a secret key using the first cryptographic element and the second cryptographic element, as indicated in square brackets. In embodiments, the first computing device determines that the two channel identifiers match if the two channel identifiers are identical. In other embodiments, the first computing device determines that the two channel identifiers match if one channel identifier is derived from the other channel identifier.

At step 365, if the first computing device determines that the two channel identifiers do not match, the first computing device may discard the information received in response to the request and/or in the notification. This may reduce the likelihood of a successful impersonation by a third party as the first computing device 1 only uses a channel if it can be confident that the same party to which the request was sent has provided the cryptographic information and channel identifier, At step 370, the second computing device 2 generates a secret key using the first cryptographic element and the second cryptographic element. As the skilled person would understand, the first and second computing devices may generate the secret key at any point after having obtained the necessary cryptographic element. In particular, the second computing device 2 may in practice generate the secret key for example before sending the notification to the first computing device 1.

In embodiments, the first cryptographic element and the second cryptographic element are public keys, and the secret key is a private key. In embodiments, the secret key is a symmetric key. In embodiments, the secret key is derived by the first computing device by computing a shared secret using a private key and the second cryptographic element, and deriving a symmetric key from the shared secret; similarly, the secret key is derived by the second computing device by computing a shared secret using a private key and the first cryptographic element, and deriving a symmetric key from the shared secret. In embodiments, the secret key is derived using a Diffie-Hellman or Elliptic-curve Diffie Hellman protocol. Any method for deriving a shared secret key using exchanged cryptographic elements may be used.

The first computing device 1 and second computing device 2 may each record the secret key and channel identifier as part of the step of generating the secret key at steps 360 and 370, respectively. The secret key can then be used by the first/second computing device to encrypt or decrypt messages that are sent or received, and that are associated with the channel identifier, thereby serving as a trusted communication channel between the first and second computing devices. In particular, the first computing device 1 and the second computing device 2 are now able to exchange messages securely using the shared secret key to encrypt and decrypt any messages sent for example over a public network such as the public internet 3. For example, the first computing device 1/second computing device 2 can send one or more messages to the second computing device/first computing device by encrypting the one or more messages using the shared secret key and including or otherwise specifying the channel identifier in the message. Conversely, the first computing device 1/second computing device 2 can receive one or more messages from the second computing device/first computing device, identify the channel identifier in the message, and decrypt the one or more messages using the shared secret key associated with the channel identifier.

In embodiments where the request comprises at least one parameter of the device, the at least one parameter of the device can be used in the encryption/decryption process. For example, the at least one parameter of the device may be used by the first and second computing devices in deriving the secret key, or may be used to apply a further layer of encryption by the first and second computing devices on any messages sent using the secure channel. Advantageously, this may contribute to ensure that the same device that has requested the creation of the channel to be the device that communicates with the second computing device over the secure channel.

Advantageously, the first and second computing devices may be able to exchange messages over the secure channel without any of these messages including personally identifiable information, such as for example a user identifier, account number, etc., or even the device identifier, once the secure channel has been set up. This may reduce the risk of sensitive information such as the device identifier being intercepted by a third party.

Further, the methods described herein enable encryption of messages exchanged between a first and a second computing device across a network in a manner similar to password-based encryption, but without requiring the user to generate or enter a password at any point in the process. This may be particularly useful in solutions that do not rely on passwords (or PINs) for authentication of a user. In other words, the methods described herein may enable a user to establish a secure channel to communicate with a remote device providing a service without providing a password to set up and/or access the service. For example, the methods described herein may be particularly useful in a context where access to a service provided by a remote device is associated with biometric authentication at the user device. In such embodiments, the methods described herein may enable a user to authenticate themselves using biometric data, then set up a secure communication channel with a remote device and interact with the device without having to provide any further personal information such as a password.

Accordingly, in embodiments, the method further comprises the first computing device 1 performing a biometric authentication of a user prior to sending the request to the second computing device, if the authentication is successful. In other words, the method may comprise the first computing device 1 receiving biometric information associated with a user and verifying the identity of the user based on the biometric information, and performing the steps described above to establish trusted communication with the second computing device 2 only if the identity of the user is verified.

In embodiments, the method further comprises the first computing device 1 generating the first cryptographic element prior to sending 300 the request to the second computing device 2. The first cryptographic element may for example be generated as a random string, such as 32 random bytes. In embodiments, the random string may be generated based on at least one parameter of the first computing device 1, such as for example the device model, device serial number, screen size, operating system etc. In such embodiments, if the second computing device 2 has knowledge of the at least one parameter of the first computing device 1 (for example because it was recorded in association with the device in a pre-registration process, or because it was received as part of a request communicated over multiple messages), it may be able to verify that the first cryptographic element is compatible with the first computing device.

In embodiments, the method may further comprise a registration process, whereby the second computing device 2 receives a request to associate a device identifier with a user identifier, and records the association in one or more databases 202. In embodiments, the second computing device forms part of a transaction infrastructure. In such embodiments, the user identifier may comprise an account number, for example as an account number associated with a payment device such as a payment card. As the second computing device records an association between the device identifier and the channel identifier upon creation of a secure channel, the first and second computing device are able to establish secure channels (which can be temporary and can be repeatedly established, for example every time the user opens a new session of the application 250) enabling the user to perform any actions associated with the user identifier. Further, according to such embodiments, no personally identifiable information other than the device identifier is exchanged at any point during the establishment of the secure channel, and no personally identifiable information is exchanged at all after the request to establish a secure channel has been sent.

In embodiments, the registration process comprises the second computing device 2 receiving a request to associate a device identifier with one or more parameters of the computing device associated with the device identifier, and recording the association in one or more databases 202. In such embodiments, upon receipt of a request to create a secure channel that comprises at least one parameter of the first computing device, the second computing device 2 may verify that the device identifier and the at least one parameter of the device received in the request match or are otherwise compatible with the one or more parameters associated with the device identifier in the database 202.

In embodiments, the method further comprises the second computing device recording a channel identifier as expired, for example by deleting the association with one or more of the elements associated with the channel identifier (e.g. device identifier, secret key). In embodiments, the second computing device 2 may record a channel identifier as expired if the second computing device does not receive any messages associated with the channel identifier for a predetermined period of time. For example, the second computing device 2 may record a channel identifier as expired it the second computing device does not receive any messages associated with (e.g. comprising) the channel identifier for a period of time of e.g. 5, 10, 15, 20 or 30 minutes.

In embodiments, the second computing device 2 may record a channel identifier as expired after a predetermined period of time has elapsed since the receipt of the request to create the secure channel and/or since the sending of the response to the request or the notification. In other words, the second computing device 2 may be configured to close channels after a set period of time regardless of whether the channel was or is being used. This may reduce the risk of attacks as in such embodiments channels are only used for a certain period of time and must be regularly re-initiated. In embodiments, the set period of time may be chosen to be long enough to allow a typical interactions between the first and second computing devices to occur over a channel, but short enough that each new interaction will trigger the initiation of a new channel. For example, the set period of time may be chosen as 5, 10, 15, 20 or 30 minutes.

In embodiments, the second computing device 2 may record a channel identifier as expired if the second computing device 2 does not receive any messages associated with the channel identifier within a predetermined period of time from the receipt of the request to create the secure channel or from the second computing device 2 sending a response to the request and a notification to the first computing device. For example, the second computing device 2 may record a channel identifier as expired it the second computing device does not receive any messages associated with (e.g. comprising) the channel identifier within a period of time of e.g. 1, 2, 5, 10, 15, 20 or 30 minutes from receiving the request to create the secure channel. Alternatively, the second computing device 2 may record a channel identifier as expired it the second computing device does not receive any messages associated with (e.g. comprising) the channel identifier within a period of time of e.g. 1, 2, 5, 10, 15, 20 or 30 minutes from the latest of sending the response to the request and sending the notification. Advantageously, the second computing device being able to close channels if they are not used may reduce the risks of the system being subject to distributed denial of service attacks. In embodiments, predetermined period of time may be chosen to be shorter than the set period of time used to close a channel that has been used to exchange messages. For example, the predetermined period of time may be chosen as 1 minute, 2 minutes or 5 minutes.

In embodiments, messages exchanged using the secure channel of the disclosure (i.e. messages encrypted using the shared secret key and identified by the channel identifier) include a counter. In such embodiments, the counter may be incremented in every new message between the first and second computing devices. Further, the second computing device 2 may record a counter associated with the channel identifier, for example in the one or more databases 202. In such embodiments, the second computing device may increment the recorded counter every time the second computing device 2 sends or receives a message over the secure channel. In embodiments, the second computing device may, after receipt of a message on a secure channel, compare the recorded counter associated with the channel identifier, with the counter in the message. If the second computing device 2 determines that the counter in the message does not correspond to a single increment of the recorded counter associated with the channel identifier, the second computing device may record the channel identifier as expired.

In embodiments, the first computing device 1 may record a counter associated with the channel identifier, for example in a memory 101. In such embodiments, the first computing device may increment the recorded counter every time the first computing device 1 sends or receives a message over the secure channel. In embodiments, the first computing device may, after receipt of a message on a secure channel, compare the recorded counter associated with the channel identifier of the message with the counter in the message. If the first computing device 1 determines that the counter in the message does not correspond to a single increment of the recorded counter associated with the channel identifier, the first computing device may record the channel identifier as expired. In embodiments, the first computing device recording the channel identifier as expired may comprise the first computing device discarding any or all of: the channel identifier, the second cryptographic element, the secret key, any subsequent message associated with the channel identifier.

Figure 4:
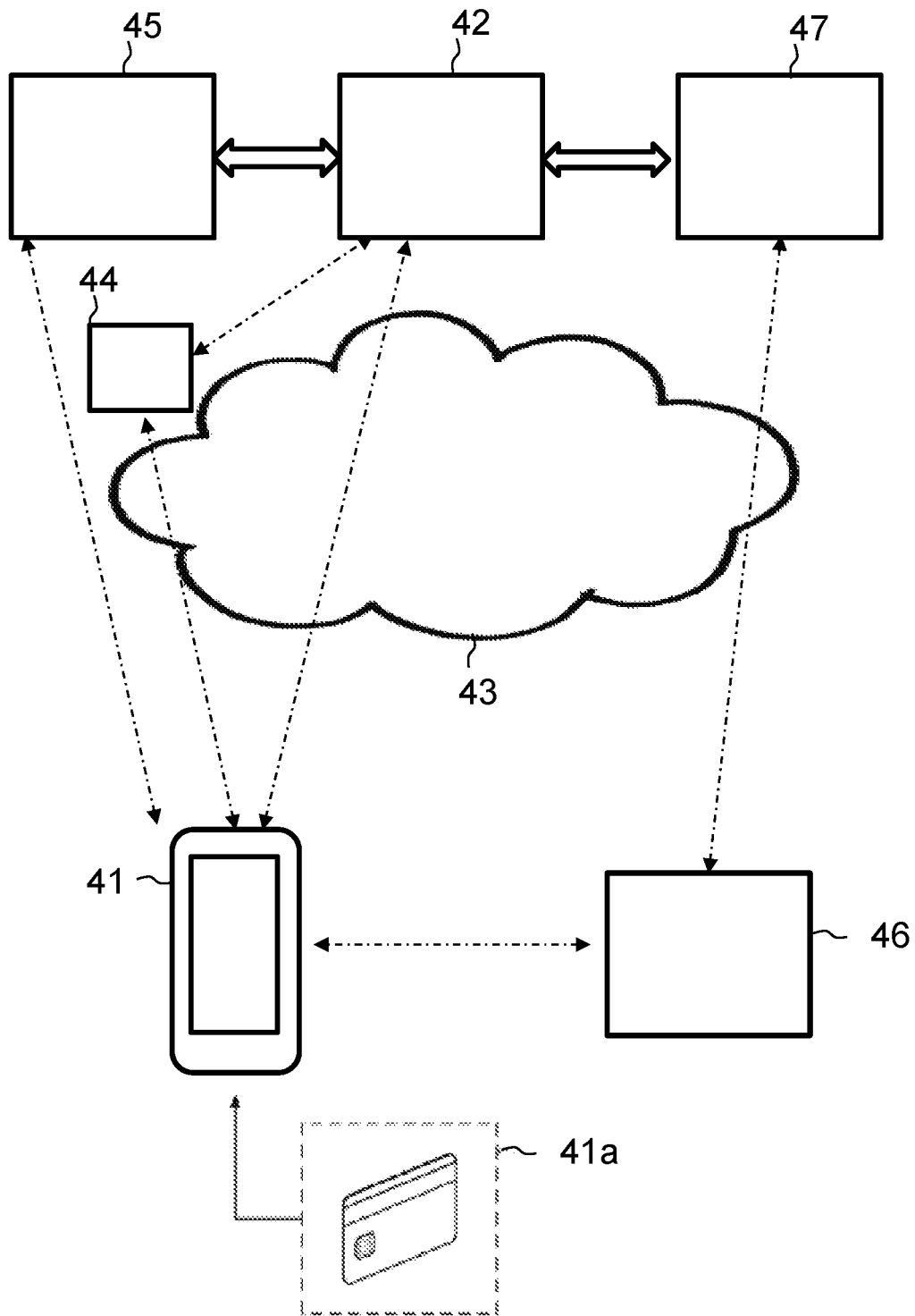
FIG. 4 shows an exemplary transaction system in which embodiments of the present disclosure may be used.

FIG. 4 shows an exemplary transaction system in which embodiments of the present disclosure may be used. The methods for establishing trusted communication between computing devices according to the disclosure may advantageously be used as part of a system and method for performing financial transactions. An example of such a system is shown on FIG. 4, where a user is provided with a payment device, for example a mobile computing device, such as a mobile phone 41. The mobile phone 41 is equipped with a digital wallet application (i.e. a digital payment service provided by a wallet provider), enabling the device to act as a proxy for a payment card 41a. The payment card 41a is provided to the user by a card issuer 45, and is associated with payment credentials such as a card/account number (PAN). In the embodiment shown, the wallet service provider is a banking infrastructure 42. However, as the skilled person would understand, the wallet service provider may be a third party (e.g. Apple Pay) or in some embodiments, the card issuer 45. The user can use the payment device 41 to purchase goods or services from a merchant, for example by interacting with a point of interaction (e.g. a point-of-sale, POS) terminal 46. The merchant POS terminal 46 is connectable to an acquirer 47, either directly or indirectly, preferably in a secure way via a network 43 (either through a dedicated channel or through a secure communication mechanism over a public or insecure channel). The issuer 45 is the bank or any other financial institution that issued the card 41a to the cardholder. The acquirer 47 provides services for card processing to the merchant.

The banking infrastructure 42 connects the issuer 45 and the acquirer 47, allowing transactions to be carried out between them. This banking infrastructure 42 will typically be provided by a transaction card provider who provides transaction card services to the issuer 45. The banking infrastructure 42 enables a merchant associated with one particular bank (acquirer 47) to accept payment transactions from a cardholder associated with a different bank (issuer 45). In particular, as will be further explained below, the banking infrastructure 42 provides authorisation at the time of purchase, clearing of the transaction and reconciliation typically within the same working day, and settlement of payments shortly after that. The banking infrastructure 42 comprises a plurality of switches, servers and databases, and is not described further here as the details of the banking infrastructure used are not necessary for understanding how embodiments of the disclosure function and may be implemented.

A typical transaction between the entities in such a system can be divided into two main stages: authorisation and settlement. The user initiates a purchase of a good or service from the merchant using their device 41. Details of the card and the transaction are sent by the terminal 46 to the issuer 45 via the acquirer 47 and the banking infrastructure 42 to authorise the transaction. In some cases, for example if the transaction is considered abnormal by the issuer 45, the cardholder may be required to undergo a verification process to verify their identity and the details of the transaction. Once the verification process is complete the transaction is authorised.

On completion of the transaction between the cardholder and the merchant, the transaction details are submitted by the merchant terminal 46 to the acquirer 47 for settlement. The transaction details are then routed to the relevant issuer 45 by the acquirer 47 via the banking infrastructure 42. Upon receipt of these transaction details, the issuer 45 provides the settlement funds to the banking infrastructure 42, which in turn forwards these funds to the merchant via the acquirer 47. Separately, the issuer 45 and the cardholder settle the payment amount between them.

The methods of the disclosure may advantageously be used in the above system to initiate the transaction and/or provide authentication through the digital wallet application, before the transaction is authorised. In particular, the methods of the disclosure may be used by the digital wallet executed by the mobile phone 41 to communicate with the wallet provider (i.e. banking infrastructure 42, in this embodiment), to authenticate the user of the mobile phone 41 as the cardholder associated with payment card 41*a* and authorise the transaction. As such, the banking infrastructure 42 may be connected to a notification service device 44, in order to send notifications to the mobile phone 41 via the digital wallet application. As the skilled person would understand, the methods of the disclosure may be advantageously used in any communication where end-to-end encryption is desirable, and in particular in any communication between e.g. a digital wallet application and a digital wallet provider, or any other banking application and. banking services provider Further embodiments of the disclosure may be provided in accordance with the scope of the disclosure as defined here.

The invention claimed is:

1. A method for a first computing device to establish trusted communication with a second computing device, the method comprising:
   sending, via the first computing device, a request to create a secure channel to the second computing device, the request comprising a first cryptographic element and a device identifier, wherein the device identifier is associated with at least one parameter of the first computing device;
   receiving, from the second computing device via the first computing device, a channel identifier computed by the second computing device in response to the request, wherein the channel identifier is one or more of the following:
      not identical to any channel identifier previously generated by the second computing device;
      not identical to any channel identifier currently in use by the second computing device; and
      not identical to any channel currently recorded in a database associated with the second computing device;
   receiving, via the first computing device, a notification from the second computing device over a secure channel using the device identifier, the notification comprising a channel identifier and a second cryptographic element;
   comparing, via the first computing device, the channel identifier received in the response to the request and the channel identifier received in the notification, and; and
   based on a determination that the two channel identifiers match, deriving, via the first computing device, a secret key using the first cryptographic element and the second cryptographic element.

2. The method of claim 1, wherein the device identifier is a device token.

3. The method of claim 1, wherein the first computing device sends the request through an application installed on the first computing device.

4. The method of claim 1, further comprising at least one or more of the following steps:
   sending, via the first computing device, one or more messages to the second computing device, wherein each message comprises the channel identifier, and sending each message comprise the first computing device encrypting the message using the secret key; and
   receiving, via the first computing device, one or more messages from the second computing device, wherein each message comprises the channel identifier, and receiving each message comprises decrypting the message using the secret key.

5. The method of claim 1, further comprising:
   based on a determination that the two channel identifiers do not match, the method further comprises one or more of the following steps:
      discarding, via the first computing device, the information received in one or more of the response to the request and in the notification; and
      generating, via the first computing device, the first cryptographic element as a random string.

6. The method of claim 5, wherein the random string is generated based on at least one parameter of the first computing device.

7. The method of claim 1, wherein the method further comprises performing, via the first computing device, a biometric authentication of a user prior to sending the request to the second computing device, and
   based upon a determination that the biometric authentication is successful, sending the request to the second computing device.

8. The method of claim 1, wherein one or more of the following is true:
   the request to create a secure channel is communicated through a public channel;
   the response to the request is communicated through a public channel;
   the channel identifier is a unique string; and
   the secret key is derived using a Diffie-Hellman or Elliptic-curve Diffie Hellman protocol.

9. The method of claim 1, wherein the method is used as part of a method of establishing trusted communication with a first computing device wherein authentication of the user is performed by biometric authentication.

10. A method for a second computing device to establish trusted communication with a first computing device, the method comprising:
   receiving, via the second computing device, a request to create a secure channel from the first computing device, the request comprising a first cryptographic element and a device identifier, wherein the device identifier is associated with at least one parameter of the first computing device;
   computing a channel identifier by the second computing device;
   sending, via the second computing device, the channel identifier to the first computing device in response to the request, wherein the channel identifier is one or more of the following:
      not identical to any channel identifier previously generated by the second computing device;
      not identical to any channel identifier currently in use by the second computing device; and not identical to any channel currently recorded in a database associated with the second computing device;

sending, via the second computing device, a notification to the first computing device over a secure channel using the device identifier, the notification comprising the channel identifier and a second cryptographic element; and based on a determination that the two channel identifiers match, deriving, via the second computing device, a secret key using the first cryptographic element and the second cryptographic element.

11. The method of claim 10, further comprising one or more of the following:

recording, via the second computing device, an association between the device identifier and the channel identifier, and receiving, via the second computing device, a request to associate a device identifier with a user identifier, and recording an association between the user identifier and the device identifier.

12. The method of claim 10, further comprising one or more of the following:

sending, via the second computing device, one or more messages to the first computing device, wherein each message comprises the channel identifier, and sending each message comprise the second computing device encrypting the message using the secret key; or receiving, via the second computing device, one or more messages from the first computing device, wherein each message comprises the channel identifier, and receiving each message comprises decrypting the message using the secret key.

13. The method of claim 12, wherein each of the one or more messages communicated using the channel identifier comprises a counter, and the method comprises computing, via the second computing device, a counter associated with the channel identifier and incrementing the counter when a message is sent or received using the channel identifier.

14. The method of claim 13, further comprising, after receipt of a message comprising a channel identifier, the second computing device:

comparing the recorded counter associated with the channel identifier and the counter in the message, and recording the channel identifier as expired if the second computing device determines that the counter in the message does not correspond to a single increment of the recorded counter associated with the channel identifier.

15. The method of claim 10, further comprising generating, via the second computing device, the second cryptographic element as a random string.

16. The method of claim 10, further comprising recording, via the second computing device, a channel identifier as expired based on the determination that one or more of the following occurs:

the second computing device does not receive any messages associated with the channel identifier for a predetermined period of time;

the second computing device does not receive any messages associated with the channel identifier within a predetermined period of time from the receipt of the request to create the secure channel; and a predetermined period of time has elapsed since the receipt of the request to create the secure channel.

17. The method of claim 10, wherein the request further comprises at least one parameter of the first computing device, and the method further comprises, via the second computing device, receiving a second request to associate the device identifier with the at least one parameter of the first computing device, recording the association between the device identifier and the at least one parameter, and upon receipt of the request from the first computing device, verifying that the device identifier in the request is associated with the at least one parameter of the first computing device.

18. The method of claim 10, wherein one or more of the following is also true:

the request to create a secure channel is communicated through a public channel;

the response to the request is communicated through a public channel;

the channel identifier is a unique string; and the secret key is derived using a Diffie-Hellman or Elliptic-curve Diffie Hellman protocol.

19. The method of claim 10, wherein the method is used as part of a method of establishing trusted communication with a first computing device wherein authentication of the user is performed by biometric authentication.

20. A computing device comprising a processor operationally connected to one or more databases, wherein the computing device is configured to establish trusted communication with a further computing device by:

receiving, via the computing device, a request to create a secure channel from the further computing device, the request comprising a first cryptographic element and a device identifier, wherein the device identifier is associated with at least one parameter of the further computing device;

computing a channel identifier by the computing device;

sending, via the computing device, the channel identifier to the further computing device in response to the request, wherein the channel identifier is one or more of the following:

not identical to any channel identifier previously generated by the computing device;

not identical to any channel identifier currently in use by the computing device; and not identical to any channel currently recorded in a database associated with the computing device;

sending, via the computing device, a notification to the further computing device over a secure channel using the device identifier, the notification comprising the channel identifier and a second cryptographic element; and based on a determination that the two channel identifiers match, deriving, via the computing device, a secret key using the first cryptographic element and the second cryptographic element.

* * * * *